United States Patent
Su

(10) Patent No.: US 9,685,020 B2
(45) Date of Patent: Jun. 20, 2017

(54) APPARATUS AND METHOD FOR CHECKING VALUE DOCUMENTS

(71) Applicant: GIESECKE & DEVRIENT GMBH, Munich (DE)

(72) Inventor: Shanchuan Su, Neubiberg (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 16 days.

(21) Appl. No.: 14/442,172

(22) PCT Filed: Nov. 13, 2013

(86) PCT No.: PCT/EP2013/003416
§ 371 (c)(1),
(2) Date: May 12, 2015

(87) PCT Pub. No.: WO2014/075796
PCT Pub. Date: May 22, 2014

(65) Prior Publication Data
US 2016/0292951 A1    Oct. 6, 2016

(30) Foreign Application Priority Data
Nov. 13, 2012  (DE) .................. 10 2012 022 216

(51) Int. Cl.
*G06K 9/00* (2006.01)
*G07D 7/06* (2006.01)
(Continued)

(52) U.S. Cl.
CPC .......... *G07D 7/06* (2013.01); *G06K 9/00442* (2013.01); *G06K 9/186* (2013.01)

(58) Field of Classification Search
CPC .................. G06K 9/00; G07D 7/00
(Continued)

(56) References Cited

U.S. PATENT DOCUMENTS 5,468,971 A * 11/1995 Ebstein .................... G07D 7/00
                                                                        250/556
6,785,405 B2 * 8/2004 Tuttle ................. G06K 9/00442
                                                                        340/5.86
(Continued)

FOREIGN PATENT DOCUMENTS

CN          2818338 Y     9/2006
CN       102737435 A    10/2012
(Continued)

OTHER PUBLICATIONS

German Search Report for corresponding German Application No. 102012022216.5, May 6, 2013.
(Continued)

*Primary Examiner* — Abolfazl Tabatabai
(74) *Attorney, Agent, or Firm* — Workman Nydegger

(57) ABSTRACT

An apparatus and a corresponding method for checking the security element of a value document, as well as to an apparatus for processing value documents involve at least one sensor for capturing electromagnetic radiation emanating from along a dimension of the security element and for generating a corresponding sensor signal pattern along the one dimension of the security element. Also included is an evaluation device for checking the value document with the help of the sensor signal pattern of the security element, from the sensor signal pattern along the one dimension there being generated a binary signal pattern which has only two different signal values and with the help of which the security element of the value document is checked with regard to a microwriting of the security element.

17 Claims, 3 Drawing Sheets

(51) Int. Cl.
*G06K 9/18* (2006.01)
*G06K 5/00* (2006.01)

(58) Field of Classification Search
USPC ....... 382/135–140, 320, 136, 137, 138, 139; 235/17, 53, 449, 493; 250/556
See application file for complete search history.

(56) References Cited

U.S. PATENT DOCUMENTS

| | | | | |
|---|---|---|---|---|
| 2006/0085843 A1* | 4/2006 | Onischuk | ............. | G07D 7/0033 |
| | | | | 726/4 |
| 2007/0242857 A1 | 10/2007 | Yamamoto | | |
| 2011/0176137 A1* | 7/2011 | Gerigk | ................. | G06K 19/086 |
| | | | | 356/446 |

FOREIGN PATENT DOCUMENTS

| | | |
|---|---|---|
| DE | 19921653 A1 | 9/2000 |
| WO | 2012139354 A1 | 10/2012 |

OTHER PUBLICATIONS

International Preliminary Report on Patentability for corresponding International PCT Application No. PCT/EP20131003416, May 19, 2015.
International Search Report for corresponding International PCT Application No. PCT/EP2013/003416, Feb. 13, 2014.
Liao et al., "A Fast Algorithm for Multilevel Thresholding," Journal of Information Science and Engineering, 2001, pp. 713-727, vol. 17.

\* cited by examiner

APPARATUS AND METHOD FOR CHECKING VALUE DOCUMENTS

BACKGROUND

The invention relates to an apparatus and a method for checking value documents, in particular bank notes, as well as to a value document processing apparatus which has the apparatus for checking value documents.

In bank note processing systems properties of bank notes, such as e.g. printed image, face value, authenticity and soiling are ascertained, by physical properties of the bank notes being captured by means of sensors and the sensor data generated hereby being evaluated by means of algorithms.

From U.S. Pat. No. 5,468,971 it is known to capture a transmission image of a security thread located on a bank note and to subject it to character recognition for ascertaining the characters incorporated in the security thread. With the help of the security thread's inscription ascertained in this manner the denomination of the respective bank note is ascertained.

The known method presupposes, in particular with the check of security elements having a very small inscription, so-called microwriting, a very high resolving power of the respective image sensors as well as of the associated optics, so that a reliable character recognition can be guaranteed.

SUMMARY

It is an object of the present invention to state a method, an apparatus, as well as an apparatus for processing value documents, with which the microwriting of a security element located on the value document can be checked in a simpler and still reliable manner.

The apparatus for checking value documents, in particular bank notes, according to the invention, has: at least one sensor for capturing electromagnetic radiation emanating from along a dimension of a security element with which a value document is provided, and for generating a sensor signal pattern along the one dimension of the security element, which corresponds to the captured electromagnetic radiation, as well as an evaluation device for checking the value document with the help of the sensor signal pattern along the one dimension of the security element.

The sensor signal pattern has along the one dimension a values range of a multiplicity of different sensor signal values. The values range may continuously or discretely consist of a multiplicity of possible (analogous or digital) sensor signal values. For every position along the one dimension the sensor generates a sensor signal value which corresponds to the electromagnetic radiation captured at this position. Along the one dimension, from the sensor signal pattern there is generated a binary signal pattern which has only two different signal values along the one dimension of the security element. In order to ascertain the binary signal pattern from the sensor signal pattern, the sensor signal pattern is binarized.

The evaluation device is configured to check the security element of the value document with regard to a microwriting of the security element, in particular with regard to sections of the security element which are inscribed with microwriting or are uninscribed. With the help of the binary signal pattern the evaluation device checks the security element, e.g., for the presence and/or the arrangement of sections of the security element which are inscribed with microwriting and for the presence and/or the arrangement of uninscribed sections of the security element which have no microwriting.

The method according to the invention for checking value documents, in particular bank notes, has the following steps: capturing electromagnetic radiation which emanates, along a dimension of a security element with which a value document is provided, from the security element, and generating a corresponding sensor signal pattern along the one dimension of the security element from the captured electromagnetic radiation, as well as checking the value document with the help of the sensor signal pattern along the one dimension of the security element. The check of the value document is carried out with the help of the sensor signal pattern along the one dimension of the security element. In so doing, from the sensor signal pattern there is ascertained a binary signal pattern which has only two different signal values along the one dimension of the security element, and the security element is checked with regard to a microwriting of the security element with the help of the binary signal pattern.

The apparatus for processing value documents, according to the invention, has at least one apparatus for processing, in particular for conveying and/or counting and/or sorting, value documents, in particular bank notes, and is characterized by the apparatus for checking value documents according to the invention.

The invention is based on the idea that for the check of a security element with regard to a microwriting of the security element there is used an intensity pattern of the electromagnetic radiation, which is captured by means of a sensor, which intensity pattern is evaluated along only one dimension of the security element. For checking the microwriting, there is used the pattern of the intensity of the electromagnetic radiation emanating from the security element, in particular transmitted through the security element, only along exactly this one dimension. With the help of the one-dimensional intensity pattern obtained in this manner there are ascertained information items about the construction of the security element along this one dimension with respect to the presence of sections provided with microwriting and sections without microwriting. In this way there can be checked a possibly present microwriting of the security element, without a character recognition of the microwriting being necessary therefor.

Instead of subjecting a two-dimensional transmission image to character recognition, according to the invention there is thus checked merely the captured intensity pattern of the electromagnetic radiation emanating from the security element along a dimension of the security element. The invention thus allows an optical check of security elements provided with microwriting, for example of a security thread provided with a negative microwriting, without the necessity that the optical resolving power of the sensor respectively employed, including optics, where applicable, has to be so great that it can resolve the characters of the microwriting. Rather, the resolving power of the sensor employed according to the invention can be smaller than the resolving power necessary for a character recognition of the microwriting.

The security element is checked along the one dimension with regard to the microwriting, no two-dimensional image evaluation with regard to the check of the microwriting of the security element being done.

The invention thus allows the security element located on the value document to be checked in a reliable manner, but with a lower expenditure.

Preferably, the at least one sensor is configured to capture the electromagnetic radiation transmitted by the security element. However, alternatively or additionally, it is also possible to capture the electromagnetic radiation remitted, i.e. diffusely and/or directionally reflected, by the security element by means of a sensor and to use it in a manner according to the invention for checking the value document. A capture of the radiation transmitted by the security element is of advantage in particular when characters in the form of gaps are incorporated in the security element, because then the transmission behaviour of inscribed and uninscribed sections of the security element particularly clearly differ from each other. This holds in particular when the non-inscribed sections of the security element are substantially opaque for the electromagnetic radiation to be captured.

Further, it is preferred that infrared radiation is captured with the at least one sensor. This allows the modulation of the intensity pattern along the one dimension of the security element to be captured with particularly high reliability. However, alternatively or additionally, it can also be provided that ultraviolet and/or visible radiation which emanates from the security element is captured by means of a corresponding sensor.

In a preferred configuration of the invention, the evaluation device is configured such that from the sensor signal pattern there is ascertained a binary signal pattern along the exactly one dimension of the security element. From the sensor signal pattern there is generated a binary signal pattern whose signal values along the one dimension of the value document can only assume two different values. The check of the security element with the help of such a binary signal pattern, for example by comparison with specified reference signal patterns, can be carried out substantially more reliably than a comparison of the original sensor signal pattern with a specified sensor signal pattern, because this has a values range of a multiplicity of values and the sensor signal itself is subject to significant fluctuations.

The individual signal values of the binary signal pattern along the one dimension of the value document can assume, for example, only the values 0 or 1. Then the binary signal pattern along the one dimension of the value document may be e.g. as follows: 011010000011010100010. The comparison of the binary signal pattern obtained in this way with specified binary signal patterns is particularly simply and reliably realizable here.

Preferably, the evaluation device has a low-pass filter for filtering the sensor signal pattern and is configured such that the binary signal pattern is ascertained from the sensor signal pattern filtered with the low pass. By the low-pass filtering portions of a higher frequency are eliminated from the sensor signal pattern, so that an intensity modulation of lower frequency due to inscribed and uninscribed sections of the security element can be identified especially reliably.

The evaluation device can also have a high-pass filter for filtering the sensor signal pattern. By the high-pass filtering portions of a lower frequency are eliminated from the sensor signal pattern, so that an intensity modulation of higher frequency, as it occurs in particular within inscribed sections of the security element, can be identified especially reliably. Starting out from the high-pass-filtered sensor signal pattern there can then be ascertained a fine structure signal pattern with the help of which a fine structure of the inscribed sections of the security element can be analyzed. The fine structure signal pattern is characteristic of the respective microwriting characters within the respective inscribed section. The fine structure signal pattern can be binary or consist of a values range with a multiplicity of possible values.

A fine structure signal pattern obtained in this manner can not only be used for checking the security element or value document with respect to authenticity, but also for checking the state of the value document, e.g., the soiling of the value document. Bank notes in relatively good states, so-called fit bank notes, show modulations with a greater amplitude in the intensity pattern of the captured electromagnetic radiation than worn-out or soiled bank notes, so-called unfit bank notes. For checking the state of the value document, there is preferably employed a fine structure signal pattern which is not binary, but shows a values range of a multiplicity of possible values.

The fine structure signal pattern can also be employed for checking the denomination of the value document, e.g. if the microwriting of the security element is different for different denominations, e.g., has microwriting digits corresponding to the denomination.

The binarization of the sensor signal pattern can be effected by the sensor signal pattern being compared with a first threshold value. The evaluation device is configured e.g. such that the binary signal pattern is ascertained with the help of a comparison of the sensor signal pattern with a first threshold value, the sensor signal pattern being filtered with a low pass before the comparison, where applicable. The sensor signal values (low-pass-filtered, where applicable) of the sensor signal pattern along the one dimension are respectively compared with the first threshold value. If the sensor signal value at the respective position lies above the first threshold value, the associated signal value of the binary signal pattern is set e.g. at the value 1. If the sensor signal value at the respective position does not lie above the first threshold value, however, the associated signal value of the binary signal pattern is set e.g. at the value 0. This allows a simply checkable binary signal pattern to be ascertained in a particularly reliable manner from the sensor signal pattern.

Alternatively, the binarization of the sensor signal pattern can also be achieved with the help of the standard deviation and/or the mean value of the sensor signal values along the dimension of the security element. The evaluation device is configured e.g. such that from the sensor signal pattern there is derived a pattern of a standard deviation and/or of a mean value along the one dimension of the security element and the binary signal pattern is ascertained with the help of the pattern of the standard deviation or mean value. In so doing, the values of the standard deviation or mean value are ascertained for respectively one position along the one dimension of the security element, in each case with the help of successive short sections along the one dimension of the security element. Such a short section comprises, for example, an in each case certain number, e.g. 50, of image points (pixels). The length of these sections (the number of the pixels) for which the mean value and the standard deviation is ascertained, is chosen e.g. in dependence on the length of the inscribed sections B of the security element.

In this embodiment it may be preferred to configure the evaluation device such that the binary signal pattern is ascertained with the help of a pattern of a relative standard deviation which is formed from the quotient of the respective standard deviation and the respective mean value along the one dimension of the security element. In the binary signal pattern obtained hereby, inscribed and uninscribed sections of the security element are reflected especially clearly, making the check of the value document especially reliable.

For example, the evaluation device is configured such that the binary signal pattern is ascertained with the help of a comparison of the pattern of the relative standard deviation with a second threshold value. Analogous to the already described embodiment, the signal value of the binary signal pattern is set e.g. at the value 1 or 0, when the corresponding value of the relative standard deviation lies above or below the second threshold value. In this way, too, a reliably checkable binary signal pattern is ascertained in a simple manner.

In another preferred configuration, the evaluation device is configured such that the binary signal pattern is ascertained with the help of a pattern of a fluctuation degree along the one dimension of the security element, the pattern of the fluctuation degree being respectively formed from the difference between a maximum value and a minimum value of the sensor signal pattern along the one dimension of the security element. Preferably, in doing so, the respective maximum value and minimum value is respectively ascertained with the help of a section along the one dimension of the security element. Such a section comprises, for example, a certain number of pixels. Also in this configuration, an easily checkable binary signal pattern is derived from the sensor signal pattern in a simple and reliable manner.

Preferably, the evaluation device is configured to check the presence and/or properties of different sections of the security element with the help of the sensor signal pattern or the binary signal pattern along the one dimension of the security element derived therefrom. It is not necessary here that two-dimensional images from the different sections, such as for example sections with and without characters, are captured and analyzed. Rather, it is sufficient to capture a one-dimensional intensity pattern of the electromagnetic radiation emanating from the security element and to analyze the intensity fluctuations, the so-called modulation, in the intensity pattern, in order to allow a conclusion as to the presence or certain properties of inscribed and uninscribed sections.

In a preferred configuration of the invention, the evaluation device is configured to ascertain a first number of first sections inscribed (with microwriting) and/or a second number of second uninscribed sections of the security element (which have no microwriting). For checking the security element, the ascertained first number and/or second number are compared e.g. with a first number of inscribed sections, which is specified for the security element, or with a second number of uninscribed sections, which is specified for the security element. If a security element has, for example, 10 characters with respectively one uninscribed section located between the individual characters—that means a total of 9 uninscribed sections—the specified first number amounts to 10 and the specified second number to 9. If from the analysis of the sensor signal pattern obtained from the security element, or the binary signal pattern derived therefrom, along the one dimension, there results that a total of 10 sections show a high light transmission and lead preferably in the binary signal pattern e.g. to the value 1, and a total of 9 sections are light-non-transmissive and lead preferably in the binary signal pattern e.g. to the value 0, the ascertained first and second number matches the respectively specified first or second number, so that the authenticity of the security element can be affirmed. An authenticity check performed in this manner is extremely reliable, despite the simple construction of the apparatus or simple carrying out.

It is further preferred to configure the evaluation device to ascertain at least one first length of first sections and/or at least one second length of second sections of the security element and to compare the first length or the second length with at least one specified first length or second length or to derive from the ascertained first lengths or second lengths a first total length or second total length, which is compared with the total length of the security element along the one dimension. In this manner, the length of individual inscribed and/or uninscribed sections can be ascertained and be compared with corresponding specified lengths. Alternatively or additionally, the thus ascertained first lengths of the inscribed sections and second lengths of the uninscribed sections, can respectively be added up and be compared with the respective total lengths of the inscribed or uninscribed sections. Alternatively or additionally, from the lengths of the inscribed and uninscribed sections there can be ascertained a total length which then is compared with a specified total length of inscribed and uninscribed sections. Also these variations of the invention allow a reliable authenticity check with an at the same time simple construction of the apparatus or simple carrying out of the method.

Alternatively or additionally, the evaluation device can be configured to ascertain a location and/or sequence of first sections and/or second sections of the security element and to check the location or sequence of the first or second sections with the help of a specified location or sequence. Also this preferred embodiment of the invention allows a simple and reliable authenticity check of the security element.

BRIEF DESCRIPTION OF THE DRAWINGS

Further advantages, features and application possibilities of the present invention arise from the following description in connection with the Figures. There are shown.

DETAILED DESCRIPTION OF VARIOUS EMBODIMENTS

Figure 1:
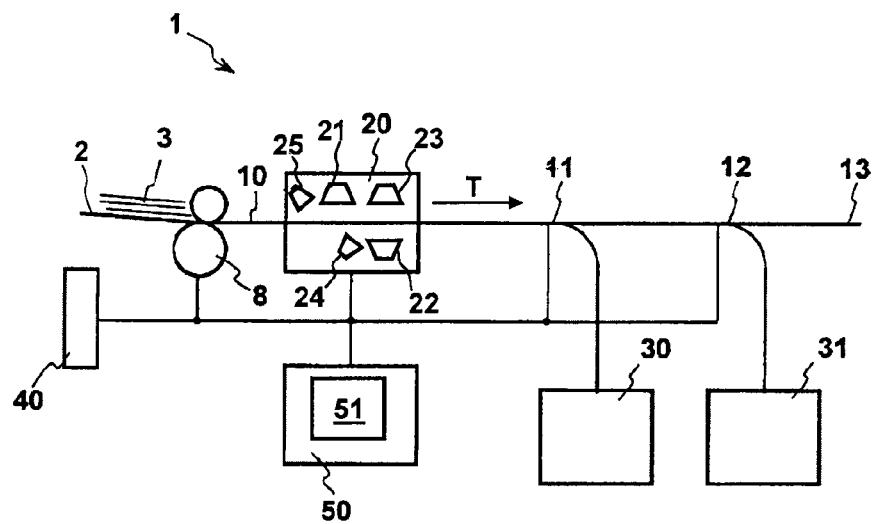
FIG. 1 an example of a schematic construction of an apparatus for processing value documents.

FIG. 1 shows an example of a schematic construction of an apparatus for processing value documents 1 with an input pocket 2 in which a stack of value documents to be processed, in particular bank notes 3, is made available, and a singler 8 by which successively respectively one (e.g. respectively the lowest) bank note of the input stack is grasped and transferred to a—in the selected representation only schematically reproduced—transport device 10 which conveys the bank note in the transport direction T to a sensor device 20.

In the represented example, the sensor device 20 comprises a first, second and third sensor 21, 22 and 23, which is respectively configured preferably as a so-called line-scan camera and captures light emanating from the bank note, in particular in the visible and/or infrared and/or ultraviolet spectral range, by means of sensor elements arranged along a line and converts it into corresponding sensor signals.

In the represented example the first and second sensors 21 or 22 capture light that is remitted, i.e. diffusely and/or directionally reflected, by the front side or back side of the bank note. The illumination of the bank note is effected by means of light sources 24, 25 arranged on both sides of the bank note. The third sensor 23 located in the region of the front side of the bank note captures the light emitted by the light source 24, incident preferably oblique on the bank note and passing, i.e. transmitting, through the bank note. The sensors 21-23 convert the detected light into corresponding sensor signals. Hence, the first and second sensors 21 or 22 are also referred to as remission cameras and, hence, the third sensor 23 is also referred to as a transmission camera.

Preferably, the line with the sensor elements of the respective sensors 21, 22 or 23 extends substantially perpendicular to the transport direction T of the bank notes, so that with every read-out process of the sensor line of the respective sensors 21, 22 or 23 there is obtained a sensor signal pattern along the sensor line, which corresponds to an intensity pattern of the light which is transmitted or remitted by the bank note in a direction extending perpendicular to the transport direction T.

The sensor signals, in particular sensor signal patterns, generated from the sensors 21 to 23 of the sensor device 20 are passed on to a control device 50 as well as to an evaluation device 51. The evaluation device 51 can be contained in the control device 50, or else form a unit separate from the control device 50.

In the evaluation device 51, the sensor signals are used, after a possible pre-processing, for checking the bank note, from the respective sensor signals statements about different properties of the respective bank note being derived, such as e.g. face value, emission, location, length and width, infrared properties, watermarks, presence or properties of additional security elements, such as e.g. security threads and/or holograms, holes, tears and missing parts, degree of soiling, dog's-ears, spots, graffiti as well as colorings over the entire area, abrasion of the printing ink, and serial number.

Depending on the respective bank note's properties ascertained in the evaluation device 51 the transport device 10 as well as the gates 11 and 12 along the transport path through the control device 50 are controlled such that the bank note is supplied to one of several output pockets 30 and 31 and is stored there. For example, in a first output pocket 30 there are stored bank notes which were recognized as authentic, while bank notes classified as false or suspect are stored in a second output pocket 31.

The reference number 13 at the end of the represented transport path shall indicate that further output pockets and/or other devices, for example for the storage or destruction of bank notes, can be provided, such as e.g. cassettes for the protected storage of the bank notes or a shredder. If, for example, a bank note could not be recognized, a special output pocket can be provided therefor, in which such bank notes are stored and made available for a separate treatment, for example, by an operator.

The apparatus for processing value documents 1 in the represented example further comprises an input/output device 40 for the input of data and/or control commands by an operator, for example, by means of a keyboard or a touchscreen, and for the output or display of data and/or information about the processing process, in particular about the bank notes respectively processed.

The exemplarily shown apparatus for processing value documents 1 is particularly suitable for checking security elements located on value documents, such as for example security threads, in order to enable conclusions on the authenticity and/or denomination of the respective value document. This is explained in more detail in the following.

Figure 2:
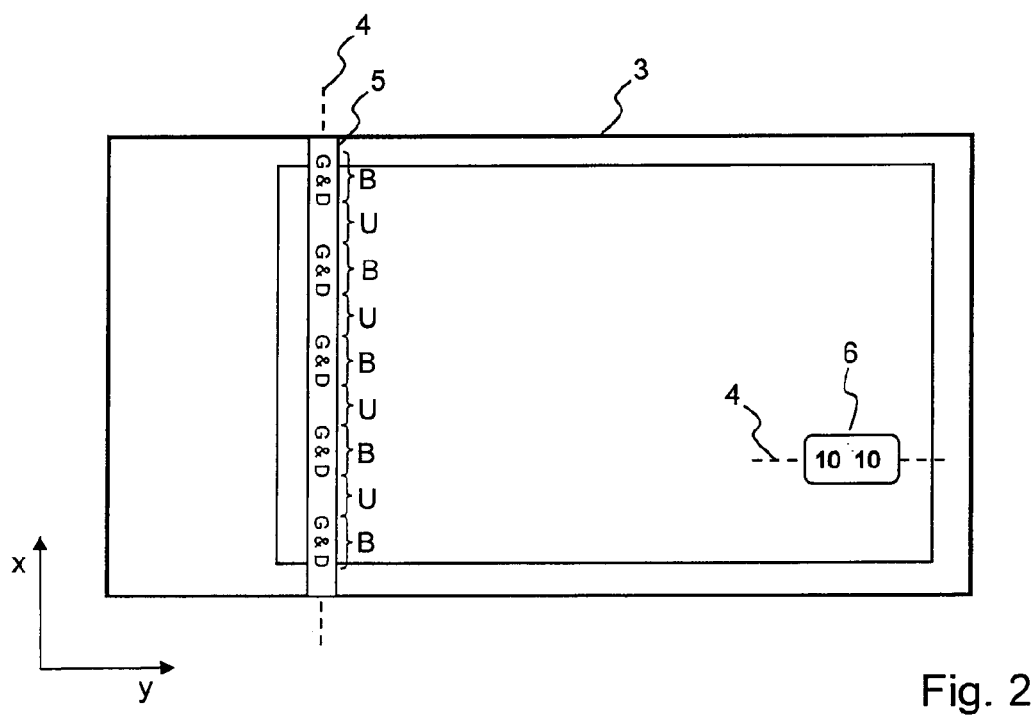
FIG. 2 an example of a value document in the form of a bank note provided with security elements.

FIG. 2 shows an example of a value document in the form of a bank note 3 which is provided with a first and second security element 5 and 6.

The first security element 5 is a security thread which in the present example extends along a first dimension x parallel to the narrow side and perpendicularly to a second dimension y in the direction of the longitudinal side of the bank note 3 and is provided with characters, in this case letters and symbols, in the form of a so-called negative microwriting in which the respective characters are formed by recesses in a light-non-transmissive layer of the security thread.

A security thread is understood here to be any type of security elements which have in a first dimension, i.e. the longitudinal direction, a substantially greater extent than in a second dimension, i.e. the width, of the security thread extending perpendicularly thereto.

Preferably, the region of the security thread, which is located outside the recesses, is non-transmissive to electromagnetic radiation in the infrared and/or visible and/or ultraviolet spectral range, so that the electromagnetic radiation can pass through the security thread merely in the region of the recesses of the respective characters. Preferably, the security thread here has at least one layer in which a metallic material is contained. For example, the security thread has a carrier layer which is provided with a metallic layer and, where applicable, additionally with a magnetic layer with magnetic pigments. The characters in the security thread then are formed by corresponding recesses or apertures in this layer system.

The security thread has inscribed sections B respectively provided with a character string as well as uninscribed sections U without characters. In the represented example, there are in total five inscribed sections B and four non-inscribed sections U. However, for the purposes of the invention also a section with only one character can be understood to be an inscribed section.

The statements regarding the first security element 5 in the form of a security thread apply accordingly also to the second security element 6 in the form of a rectangle with rounded corners, which in the present example has digits which are configured on the second security element 6.

According to the invention, with at least one of the sensors 21 to 23 (see FIG. 1) the light emanating along a dimension of the respective security element 5 or 6 is captured, converted into a corresponding sensor signal pattern along the one dimension of the security element 5 or 6, and supplied to the evaluation device 51 and there analyzed for the purpose of the authenticity check and/or denomination recognition of the security element or the bank note.

In the case of the first security element 5 configured as a security thread, the dimension along which the light emanating from the security thread is captured is the longitudinal direction x of the security thread, which in the example of the FIG. 2 extends parallel to the width of the bank note 3. Preferably, the light transmitted and/or remitted along the direction x in the region of the center of the security thread is captured here. The sensor line of the corresponding sensors 21, 22 or 23 (see FIG. 1) here extends substantially along the center line 4 indicated in dashed lines in FIG. 2.

In the case of the second security element 6, a sensor signal pattern is ascertained preferably in the y direction and a corresponding sensor signal pattern is generated and analyzed along the y direction.

Figure 3:
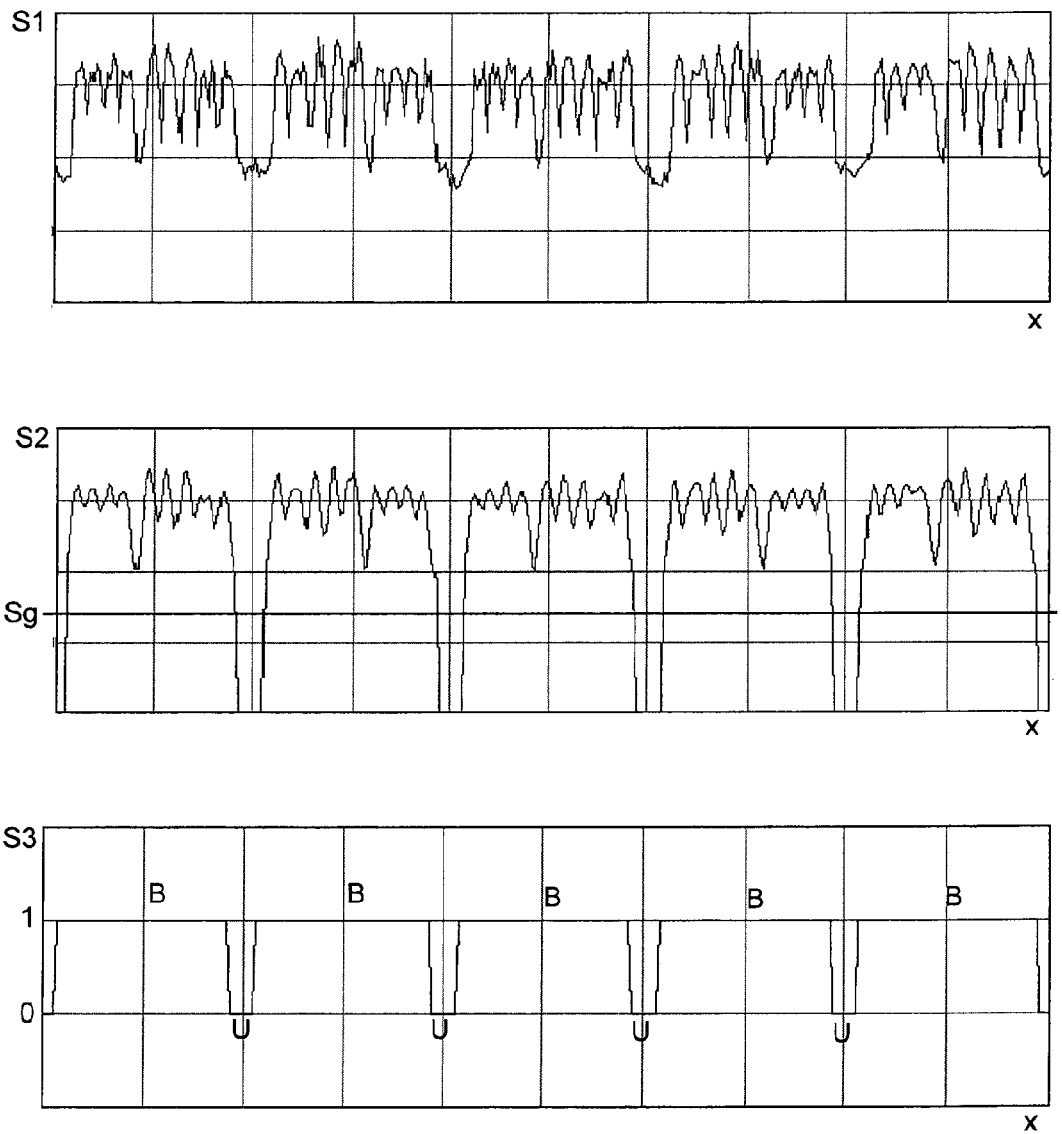
FIG. 3 examples of a sensor signal pattern (on top), a sensor signal pattern filtered by means of low pass (center), and a binary signal pattern derived therefrom (below)

The upper part of the FIG. 3 shows an example of a sensor signal pattern S1 captured along the longitudinal direction x of the first security element 5, configured as a security thread, by means of the transmission camera 23 (see FIG. 1). In this case the sensor signal pattern S1 corresponds to the infrared light intensity transmitted by the security thread. Longer sections with higher, strongly varying transmission values alternate here with sections of lower transmission, the former corresponding to the inscribed sections B and the latter to the uninscribed sections U of the security thread along the longitudinal direction x.

The sensor signal pattern S1 is subjected to a low-pass filtering by which intensity fluctuations of higher frequency are eliminated and intensity fluctuations of lower frequency can pass. The filtered sensor signal pattern S2 along the longitudinal direction x of the security thread obtained thereby is represented in the central part of the FIG. 3. Regions of low transmission differ here substantially more clearly from regions of higher transmission than this is the case in the original sensor signal pattern S1.

In another processing step, the individual sensor signal values of the filtered sensor signal pattern S2 along the longitudinal direction x of the security thread are compared to a threshold value Sg. If the respective sensor signal value lies above the threshold value Sg, a signal value is set at the value 1. If the sensor signal value is equal to or smaller than the threshold value Sg, a corresponding signal value is set at the value 0. This comparison operation is carried out for the whole filtered sensor signal pattern 2 along the longitudinal direction x, thereby a pattern of the ascertained signal values, i.e. a binary signal pattern S3, along the longitudinal direction x of the security thread being obtained which has only two different values, namely 1 or 0. As can be seen with the help of the binary signal pattern S3 shown in the lower part of FIG. 3, inscribed sections B of the security thread (signal value 1) as well as uninscribed sections U of the security thread (signal value 0) and their absolute location along the longitudinal direction x can be simply and unambiguously identified.

The above-described method for deriving the binary signal pattern S3 from the original sensor signal pattern S1 represents a particularly preferred method for ascertaining the binary signal pattern S3. Alternatively, the binary signal pattern S3 can also be generated without low-pass filtering directly from the sensor signal pattern S1, e.g. by comparing the sensor signal pattern S1 itself with a threshold Sg.

Alternatively, from the sensor signal pattern S1 there can also be formed values for the standard deviation and the mean value of the transmission intensity as a function of the location x along the security thread, for example, for respectively one certain pixel section along the longitudinal direction x. From the ascertained values of the standard deviation or of the mean value there is then calculated a relative standard deviation of the intensity pattern along the longitudinal direction x for the pixel section, by forming the quotient of the respective values of the standard deviation and the mean value. Then the relative standard deviation can likewise be compared with a threshold value, thereby likewise, analogous to the method described above in more detail, a binary signal pattern being obtained.

In another variant it is possible to employ, instead of the standard deviation, a fluctuation degree which is determined from the difference of a maximum value and a minimum value of the transmission intensity over the respective pixel sections.

As already mentioned, the intensity pattern of the light emanating from, in particular transmitted by, the security thread, is ascertained preferably along a line which extends in the longitudinal direction x in the center of the security thread (see center line 4 in FIG. 2). In comparison to a capture of the light over the entire width of the security thread in the y direction, the special advantage here is achieved by the sensor line of the respective sensors 21, 22 or 23 always lying, despite fluctuations of the security thread position on the bank note to be respectively checked, reliably above the security thread to be checked and the microwriting located thereon.

Basically, also several sensor signal patterns lying centrally can be captured and be combined into one sensor signal pattern and be evaluated in the described manner. Alternatively, it is also possible that two or more sensor signal patterns along the longitudinal direction x of the security thread are evaluated or checked separately from each other in the manner described above.

With the help of the binary signal pattern S3 there can be ascertained in a simple and reliable manner whether the security thread has inscribed sections B at all, by for example checking whether the first binary value, i.e. 0 or 1, occurs at all. If, for example, a bank note to be respectively checked is equipped with security threads which have a microwriting, but in a concretely checked bank note the first binary value, i.e. 0 or 1, does not occur, however, the authenticity of the checked bank note is denied.

Further, it is possible to ascertain the number of inscribed sections B and uninscribed sections U from the binary signal pattern S3 and to compare it with a respectively deposited number. In the present example, a first number of 5 inscribed sections B as well as a second number of 4 uninscribed sections U would be compared with a corresponding specified first or second number. If these numbers do not match, the bank note is classified as not genuine. The specified number can also comprise a values range, in order to take into account that the x position of the inscription of the security thread can vary. For example, 4-6 inscribed sections can be valued as valid.

Alternatively or additionally, it is possible to ascertain the absolute length or the length portion of the inscribed sections B and/or of the uninscribed sections U along the longitudinal direction x of the security thread and to compare it with corresponding specified values. For example, in doing so, the lengths of the uninscribed and inscribed sections can be added and the sum of the lengths of the inscribed sections and the sum of the lengths of the uninscribed sections be checked, e.g., in relation to the entire security thread length. For example, the percentage of the inscribed or uninscribed sections in the entire security thread length is checked and compared to specified values. Also the relation between the added-up length of the uninscribed sections and the added-up length of the inscribed sections can be checked.

Alternatively or additionally, it can be provided that the absolute and/or relative location of the inscribed sections B along the longitudinal direction x of the security thread and/or a sequence of inscribed sections B and uninscribed sections U along the longitudinal direction x of the security thread is checked by comparing the respectively ascertained location or sequence e.g. with a corresponding specified location or sequence.

For example, for this purpose the binary signal pattern S3 can be compared with a specified reference signal pattern which is deposited for the security thread of the respective bank note type. Since the relative location of the inscribed and uninscribed sections B or U in the bank note to be respectively checked is normally unknown, because the location of the security thread generally varies in longitudinal direction, the ascertained binary signal pattern S3 along the longitudinal direction x is shifted step by step over the respective reference signal pattern and in doing so there is e.g. respectively calculated a correlation. If the ascertained binary signal pattern S3 and the specified reference signal pattern can be brought in conformity in this manner by shifting—the correlation results in a high value in this case—the bank note will be classified as authentic or the associated denomination will be confirmed. Otherwise, the bank note is identified as a forgery.

Alternatively or additionally to the above-described evaluation of the sensor signal pattern S1, this can also be analyzed with respect to its fine structure, by, likewise, fluctuations of the transmitted light intensity within the inscribed sections B being evaluated. These fluctuations are influenced by the form, the distance and the size of the respective characters of the employed microwriting. This is explained in more detail in the following.

Figure 4:
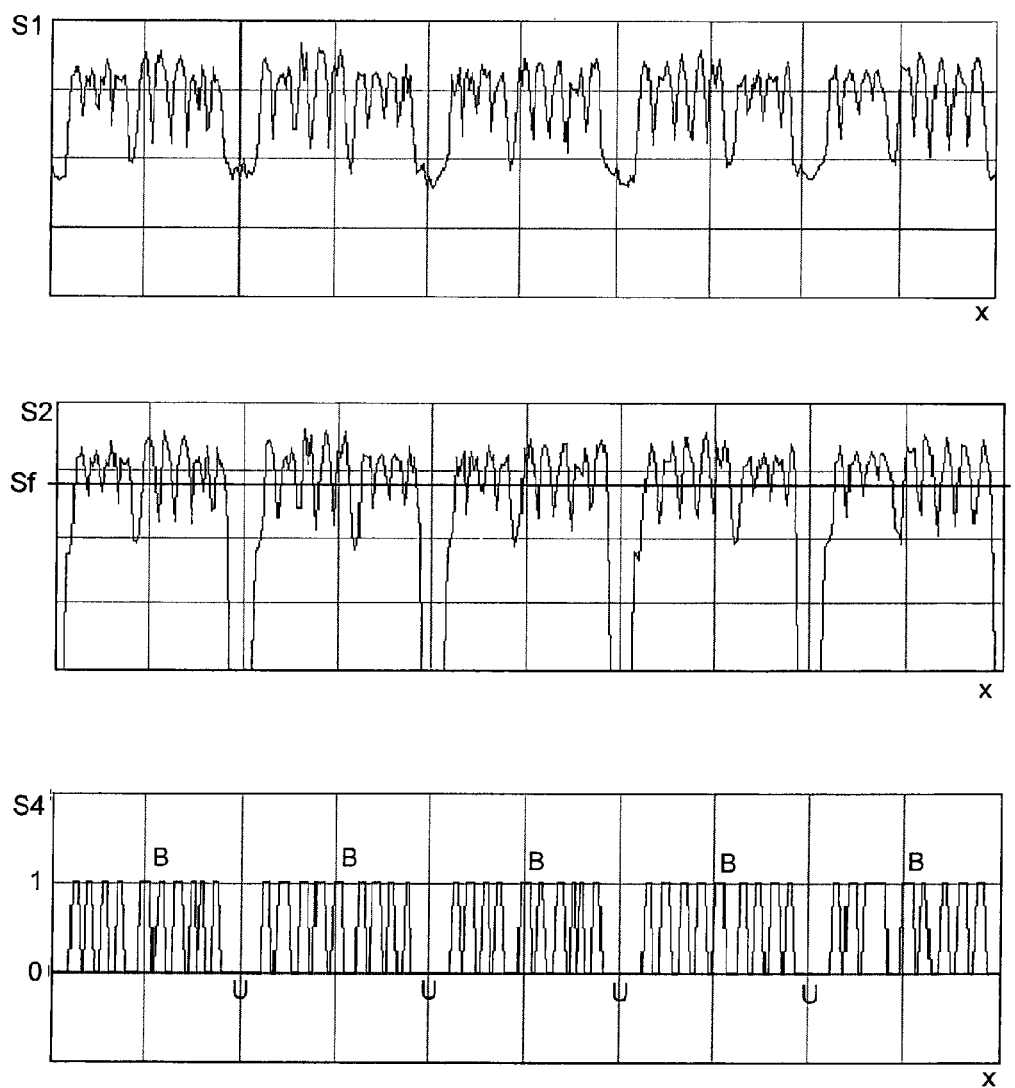
FIG. 4 examples of a sensor signal pattern (on top), a sensor signal pattern filtered by means of high pass (center), and a fine structure signal pattern derived therefrom (below).

The upper part of FIG. 4 shows a sensor signal pattern S1 along the longitudinal direction x of the security thread. To enable the fine structure of the sensor signal pattern S1 to be analyzed better, this can first be subjected to a high-pass filtering, by which portions of higher frequency are retained in the sensor signal pattern S1, while portions of lower frequency are weakened. An example of an accordingly filtered sensor signal pattern S2 is represented in the central part of FIG. 4.

To evaluate the degree of intensity fluctuations within the inscribed sections B, for example the respective standard deviation or relative standard deviation of the intensity pattern is formed. The above explanations in connection with the analysis of the filtered sensor signal pattern represented in the central part of FIG. 3 apply accordingly here. Alternatively, it is also possible to calculate the fluctuation between minimum values and maximum values within the respectively inscribed sections B, by for example forming the difference from the respective maximum value and minimum value or calculating a relative fluctuation referring to the respective mean value. The fluctuations ascertained thereby are then checked, for example as to whether they lie within a specified values range.

Advantageously, the evaluation of the fine structure of the transmission intensity pattern can also be employed for the so-called fitness check, i.e. check of the state, of the bank notes. As has surprisingly been detected in tests, the degree of intensity fluctuations in the region of inscribed sections B in so-called unfit bank notes, which already have a relatively high rate of wear, is significantly lower than in so-called fit bank notes which are in a relatively good state. Upon the fitness check, the degree of the ascertained intensity fluctuations can likewise be compared for example with a specified threshold value. If the intensity fluctuations lie above this threshold value, the bank note can thus be classified as fit, otherwise as unfit, For example, from the filtered sensor signal pattern S2 (see central part of FIG. 4) there is ascertained a binary fine structure signal pattern S4, by the high-pass-filtered sensor signal pattern S2 being compared with a threshold value Sf which in this case lies in the region of the intensity fluctuations of the respectively inscribed sections. Sensor signal values lying above the threshold value Sf lead to a signal value of 1, whereas sensor signal values equal to or below the threshold value Sf lead to a signal value of 0. A binary fine structure signal pattern S4 formed from the ascertained signal values along the longitudinal direction x of the security thread is shown in the lower part of FIG. 4.

The location and sequence of the individual signal values, in particular of the signal values with a value of 1 in the individual inscribed sections B is checked, for example, by the fine structure signal pattern S4 along the longitudinal direction x of the security thread being compared, in sections where applicable, with a reference signal pattern. The explanations given in connection with the example shown in FIG. 3 apply accordingly here.

Alternatively or additionally, the respective fine structure signal patterns S4 in the individual inscribed sections B can also be compared with each other, for example to the effect whether the locations and sequences of the individual signal values having a value of 1 match each other in the individual inscribed sections B. For this purpose, the fine structure signal patterns S4 of respectively two inscribed sections B are correlated with each other and it is checked whether the calculated correlation value exceeds a minimum value. This check is of advantage in particular when the inscription located on the security thread consists of recurring sections, so that the respective intensity patterns of two inscribed sections B substantially match.

However, it is also conceivable to check, with the help of the fine structure, the mirror symmetry of a mirror-symmetrically inscribed security thread in which the intensity pattern of an inscribed section B is reversely identical with the intensity pattern of the section B inscribed mirror-symmetrical thereto. The mirror symmetry of the microwriting of these sections can be checked by comparing the fine structure signal patterns S4 of two inscribed sections B, e.g. by means of correlation.

The invention claimed is:

1. An apparatus for checking the security element of a value document, comprising:
   at least one sensor for capturing electromagnetic radiation emanating from along a dimension of the security element and for generating a sensor signal pattern along the one dimension of the security element, which corresponds to the captured electromagnetic radiation; and
   an evaluation device for checking the value document, which is configured to ascertain from the sensor signal pattern a binary signal pattern which has only two different signal values along the one dimension of the security element, the binary signal pattern corresponding to and forming a representation of the sensor signal pattern, and which is configured to check the security element with the help of the binary signal pattern with regard to a microwriting of the security element.

2. The apparatus according to claim 1, wherein the evaluation device is configured to check the security element with the help of the binary signal pattern with regard to sections of the security element which are inscribed with microwriting and uninscribed.

3. The apparatus according to claim 1, wherein the evaluation device checks the security element with regard to the microwriting only along the one dimension.

4. The apparatus according to claim 1, wherein the evaluation device is configured such that the binary signal pattern is ascertained with the help of a comparison of the sensor signal pattern with a first threshold value.

5. The apparatus according to claim 1, wherein the evaluation device has a low-pass filter for filtering the sensor signal pattern and is configured such that the binary signal pattern is ascertained from the sensor signal pattern filtered with the low-pass filter.

6. The apparatus according to claim 1, wherein the evaluation device is configured such that from the sensor signal pattern there is ascertained a pattern of a standard deviation of the sensor signal pattern and/or of a mean value of the sensor signal pattern along the one dimension of the security element and the binary signal pattern is ascertained with the help of the pattern of the standard deviation or of the mean value of the sensor signal.

7. The apparatus according to claim 6, wherein the evaluation device is configured such that the binary signal pattern is ascertained with the help of a pattern of a relative standard deviation of the sensor signal pattern, which relative standard deviation is formed from the quotient of the respective standard deviation of the sensor signal pattern and the respective mean value of the sensor signal pattern along the one dimension of the security element.

8. The apparatus according to claim 1, wherein the evaluation device is configured to check, with the help of the binary signal pattern along the one dimension of the security element, the presence and/or properties of sections of the security element which are inscribed with microwriting and uninscribed.

9. The apparatus according to claim 8, wherein the evaluation device is configured to ascertain a first number of the sections inscribed with microwriting and/or a second number of the uninscribed sections of the security element and to compare the first number or second number with a specified first number or a specified second number.

10. The apparatus according to claim 8, wherein the evaluation device is configured to ascertain at least one first length of the inscribed sections and/or at least one second length of the uninscribed sections of the security element and to compare the first length or second length with at least one specified first length or second length or to derive from the ascertained first lengths or second lengths a first total length or second total length which is compared with the total length of the security element along the one dimension.

11. The apparatus according to claim 8, wherein the evaluation device is configured to ascertain a location and/or sequence of the inscribed sections and/or of the uninscribed sections of the security element and to check the location or sequence of the inscribed or uninscribed sections with the help of a specified location or sequence.

12. The apparatus according to claim 1, wherein the evaluation device is configured to ascertain from the sensor signal pattern additionally a fine structure signal pattern along the one dimension, with the help of which a fine structure of the security element's sections inscribed with microwriting can be analyzed, which is characteristic of the microwriting characters within the respective inscribed section.

13. The apparatus according to claim 12, wherein the evaluation device is configured to use the fine structure signal pattern for checking the value document, in particular for checking the denomination and/or the state of the value document.

14. An apparatus for processing value documents with at least one apparatus for processing, in particular for conveying and/or counting and/or sorting, value documents and with an apparatus for checking the security element of a value document according to claim 1.

15. A method for checking the security element of a value document, with the following steps:

capturing electromagnetic radiation which emanates from the security element along a dimension of the security element, and generating a corresponding sensor signal pattern along the one dimension of the security element from the captured electromagnetic radiation and checking the value document with the help of the sensor signal pattern along the one dimension of the security element, wherein from the sensor signal pattern there is ascertained a binary signal pattern which has only two different signal values along the one dimension of the security element, the binary signal pattern corresponding to and forming a representation of the sensor signal pattern, and wherein the security element is checked with regard to a microwriting of the security element with the help of the binary signal pattern.

16. An apparatus for checking the security element of a value document, comprising:

at least one sensor for capturing electromagnetic radiation emanating from along a dimension of the security element and for generating a sensor signal pattern along the one dimension of the security element, which corresponds to the captured electromagnetic radiation; and an evaluation device for checking the value document, which is configured to ascertain from the sensor signal pattern a binary signal pattern which has only two different signal values along the one dimension of the security element, and which is configured to check the security element with the help of the binary signal pattern with regard to a microwriting of the security element, wherein the evaluation device is configured to check, with the help of the binary signal pattern along the one dimension of the security element, the presence and/or properties of sections of the security element which are inscribed with microwriting and uninscribed.

17. A method for checking the security element of a value document, with the following steps:

capturing electromagnetic radiation which emanates from the security element along a dimension of the security element, and generating a corresponding sensor signal pattern along the one dimension of the security element from the captured electromagnetic radiation and checking the value document with the help of the sensor signal pattern along the one dimension of the security element, wherein from the sensor signal pattern there is ascertained a binary signal pattern which has only two different signal values along the one dimension of the security element, and wherein the security element is checked with regard to a microwriting of the security element with the help of the binary signal pattern, wherein the evaluation device is configured to check, with the help of the binary signal pattern along the one dimension of the security element, the presence and/or properties of sections of the security element which are inscribed with microwriting and uninscribed.

* * * * *